United States Patent [19]

Dietzen et al.

[11] Patent Number: 5,071,296
[45] Date of Patent: Dec. 10, 1991

[54] CHUCK KEY CLIP AND METHOD FOR MANUFACTURING

[75] Inventors: William H. Dietzen, Fayetteville, N.C.; Robert G. Moores, Jr.; Robert I. Somers, both of Reisterstown, Md.

[73] Assignee: Black & Decker Inc., Newark, Del.

[21] Appl. No.: 567,857

[22] Filed: Aug. 15, 1990

[51] Int. Cl.⁵ ............................................. B23B 45/00
[52] U.S. Cl. .................................... 408/241 R; 81/16; 279/1 K
[58] Field of Search ....................... 81/16; 408/241 R; 279/1 K

[56] References Cited

U.S. PATENT DOCUMENTS

| | | |
|---|---|---|
| 2,257,559 | 9/1941 | Albertson . |
| 2,824,651 | 2/1958 | Davis .............................. 408/241 R |
| 2,941,426 | 6/1960 | Muller et al. . |
| 3,049,946 | 8/1962 | Schelke . |
| 4,093,396 | 6/1978 | Widigs . |
| 4,274,772 | 6/1981 | Widigs . |
| 4,534,573 | 8/1985 | Somers . |

FOREIGN PATENT DOCUMENTS 7017215 5/1970 Fed. Rep. of Germany .
2176146 7/1989 United Kingdom .

*Primary Examiner*—Daniel W. Howell
*Attorney, Agent, or Firm*—Dennis A. Dearing; Charles E. Yocum; John D. Del Ponti

[57] ABSTRACT

A chuck key clip 11 has a pair of spaced parallel sidewalls 17, 19 connected by a web 21. A cord receiving channel 23 and a key handle receiving channel 61 are formed by the sidewalls 17, 19 and web 21. The key channel may have an inwardly converging handle clamp 67 and an inwardly converging key shank clamp 71 to securely and detachably retain the key 13 in the clip. For comfort and ease of use, thumb depressions 107, 109 may be formed in the outer surface of sidewalls 17, 19. Web 21 may contain openings 99, 101 opposite to a cord clamping means 27 formed in the cord channel 23. Openings 99, 101 result from the method for molding the clip in a mold movable only in a single direction (i.e. without side movement). The formation of inwardly converging clamps 27, 67 in the parallel cord and key channels 23, 61 in a mold 131 without side movement simplifies the manufacturing process and contributes to the low cost of clip 11.

16 Claims, 5 Drawing Sheets

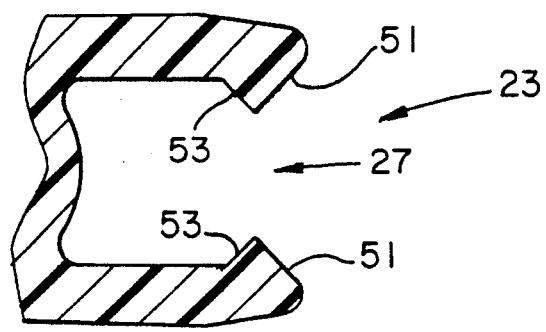
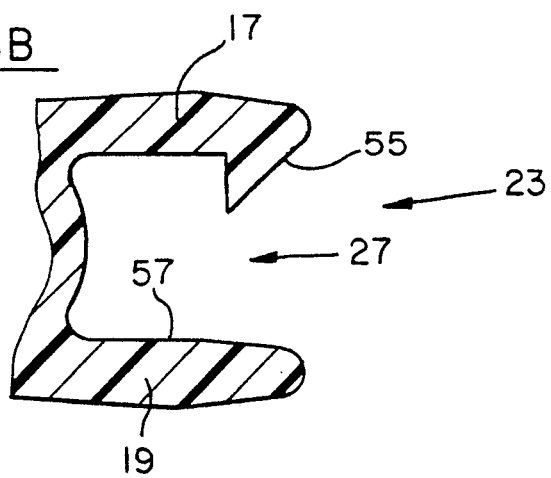
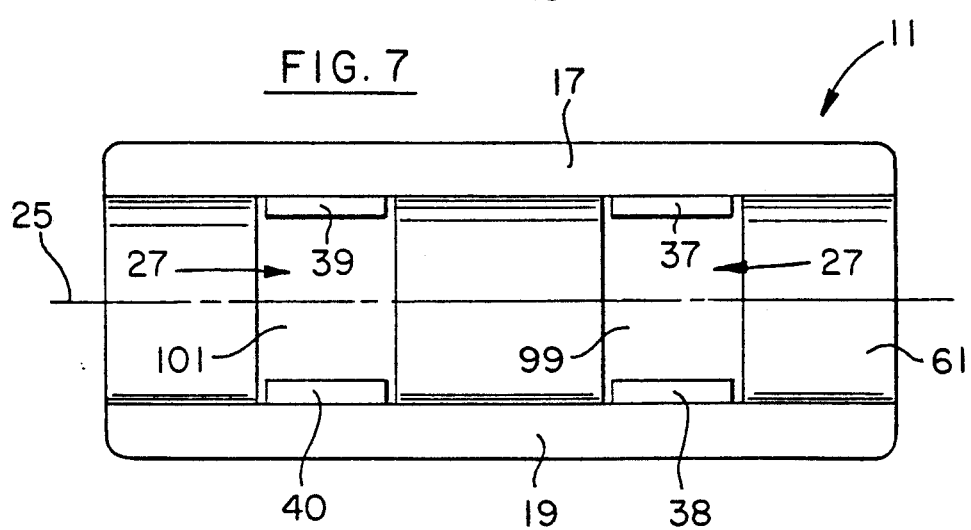

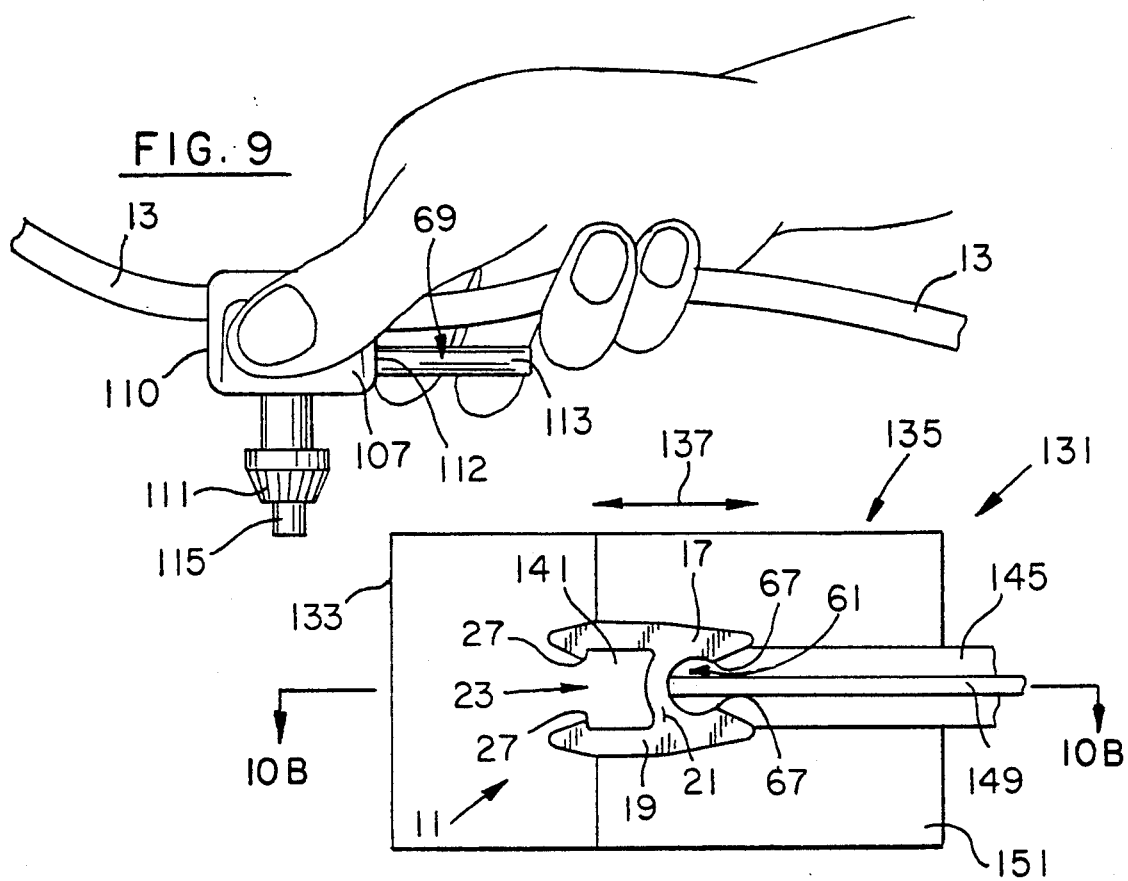
FIG. 9
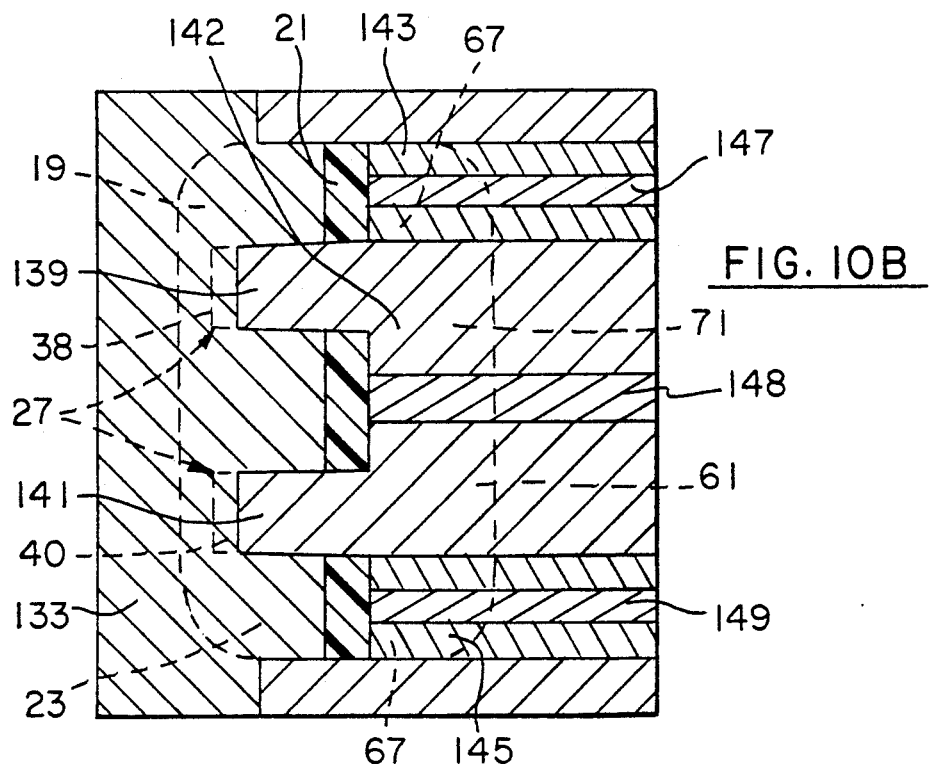
FIG. 10A
FIG. 10B

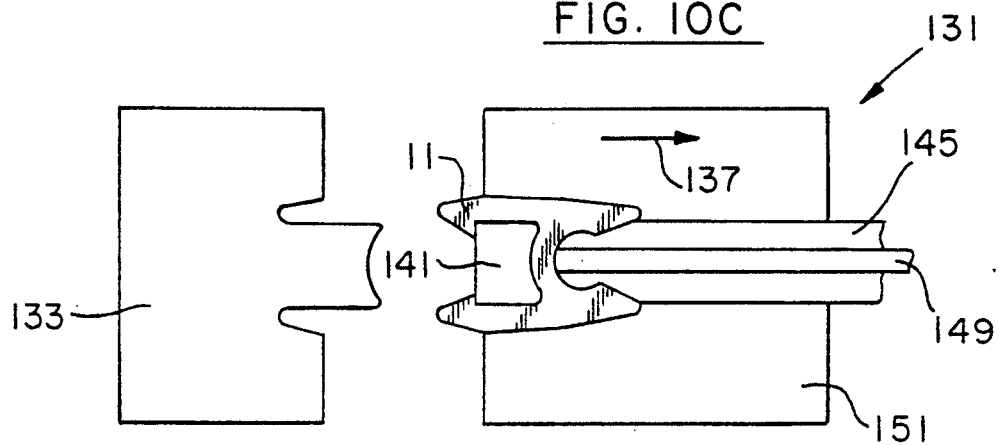
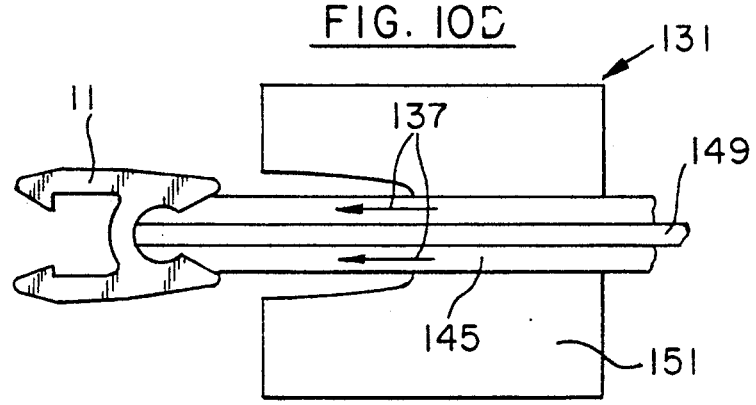
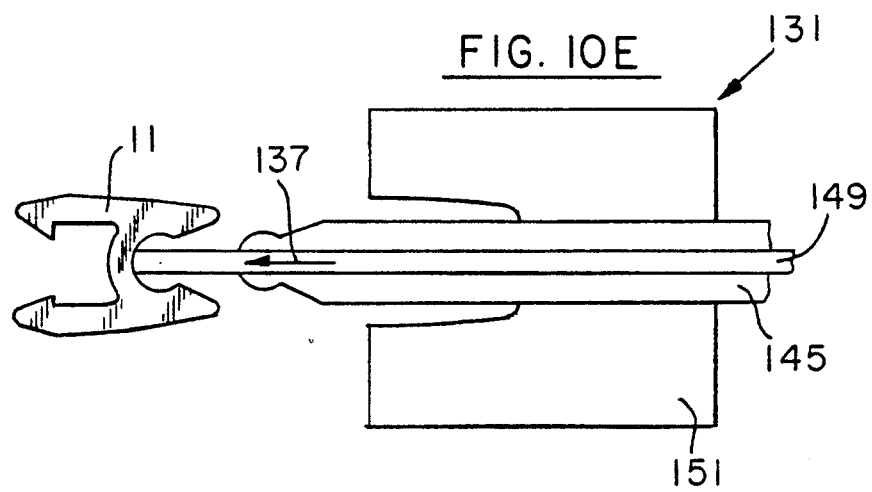

5,071,296

CHUCK KEY CLIP AND METHOD FOR MANUFACTURING

FIELD OF THE INVENTION

The present invention relates to a holder for a chuck key and a method for making the key. The key preferably has a pinion gear for tightening a chuck or alternatively may have a hexagonal cross-sectional configuration.

BACKGROUND OF THE INVENTION

Chuck keys are used to open and close the jaws of a chuck on a bit for various portable power tools. The key commonly has a pinion gear which fits into a gear of the chuck. Rotation of the key opens and closes the jaws of the chuck and thereby facilitates changing of a bit clamped in the jaws.

Numerous means have been used to retain the chuck key associated with the tool. For example, the key may be mounted in a recess in the tool. This has been found to be disadvantageous because of the cost of forming the tool with the recess and because the key may be lost when removed from the recess for use. Secondly, the chuck key may be attached to the power cord of the tool with a strap. Such straps have been found to be disadvantageous because the key may swing freely and interfere with the workpiece or, otherwise, get in the way. Various rigid holders for attaching the key to the power cord are also known. Examples of such holders are shown, for example, in U.S. Pat. Nos. 2,257,559, 2,941,426 and 4,274,772. Such holders have been found to be generally disadvantageous for reasons such as complexity in attachment to the cord, inconvenience, high cost and the lack of a suitable retainer which minimizes loss of the key.

Accordingly, the primary object of this invention is to provide a low cost chuck key holder which is convenient and comfortable to use, which securely retains the key but allows detached use of the key if desired, and which may be manufactured by a simple low cost method.

SUMMARY OF THE INVENTION

In accordance with one aspect of the invention, a chuck key clip comprises a pair of spaced, resilient sidewalls. A resilient web connects the sidewalls. A cord channel for receiving an electric cord extends along a first axis and is defined by the sidewalls and one side of the web. A key channel for receiving the key handle extends along a second axis generally parallel to the first axis and is formed by the sidewalls and the opposite side of the web.

The cord channel may have a cord clamp means extending from the sidewalls for gripping the electric cord.

The key channel may have a handle clamp for receiving the key handle and inwardly converging in a direction that is generally transverse to the second axis and also may have a shank clamp for receiving the key shank and inwardly converging in a plane generally parallel to the second axis. The handle and shank clamps securely and detachably retain the key in the clip.

The web may contain an opening opposite to the cord clamping means in a direction transverse to the first and second axis. The opening results from the method for molding the clip in a mold movable only in a single direction (i.e., without side movement).

For comfort and ease of use, a thumb depression may be provided in the outer surface of at least one sidewall.

The method for making the clip described above in a plastic injection mold which does not require side movement or side pulls (i.e., the requirement to have mold components which move laterally to the direction for opening and closing the mold) is another important aspect of the invention. The method comprises three primary steps. The first step is to mold the clip in a mold having a cavity segment and a core segment which are relatively movable between opened and closed positions in a first direction transverse to the key and cord channels of the clip. The second step is to form a clamp inwardly converging in a second direction transverse to the direction of mold movement in a first clip channel on a core bar. The bar extends parallel to the direction of mold movement through the second channel of the clip, through an opening in the web and into the first channel. The third step is to form a second clamp inwardly converging in the second direction transverse to the direction of mold movement in the second channel on a core ejector which extends parallel to the direction of mold movement. The formation of inwardly converging clamps in parallel channels in a mold without side movement simplifies the manufacturing process, reduces mold equipment cost, provides a durable mold design and contributes to the production of the clip at a low per unit cost.

Additional objects and advantages of the invention will be apparent from the detailed description of the preferred embodiment, the appended claims and the accompanied drawings or may be learned by practice of the invention.

BRIEF DESCRIPTION OF THE DRAWINGS

The accompanying drawings which are incorporated in, and constitute a part of, this specification illustrate multiple embodiments of the invention and together with the description served to explain the principles of the invention. In the drawings, the same reference numerals indicate the same parts.

FIG. 7 is a side-elevational view taken along line 7—7 of FIG. 5.

FIG. 8A and 8B are fragmentary cross-sectional views of alternate embodiments of cord clamps for a clip in accordance with the present invention. The cross-sections are taken along a plane transverse to the clip channels.

FIG. 9 is an elevational view illustrating the manner of use of the clip and chuck key of the present invention.

FIG. 10A, 10C, 10D and 10E depict schematically, in sequence, the preferred embodiment of a method for molding a chuck key in accordance with another aspect of the present invention.

FIG. 10B is a cross-sectional diagram taken along lines 10B—10B of FIG. 10A illustrating a clip in the mold for practicing the method of the present invention.

DESCRIPTION OF THE PREFERRED EMBODIMENT

Figure 1:
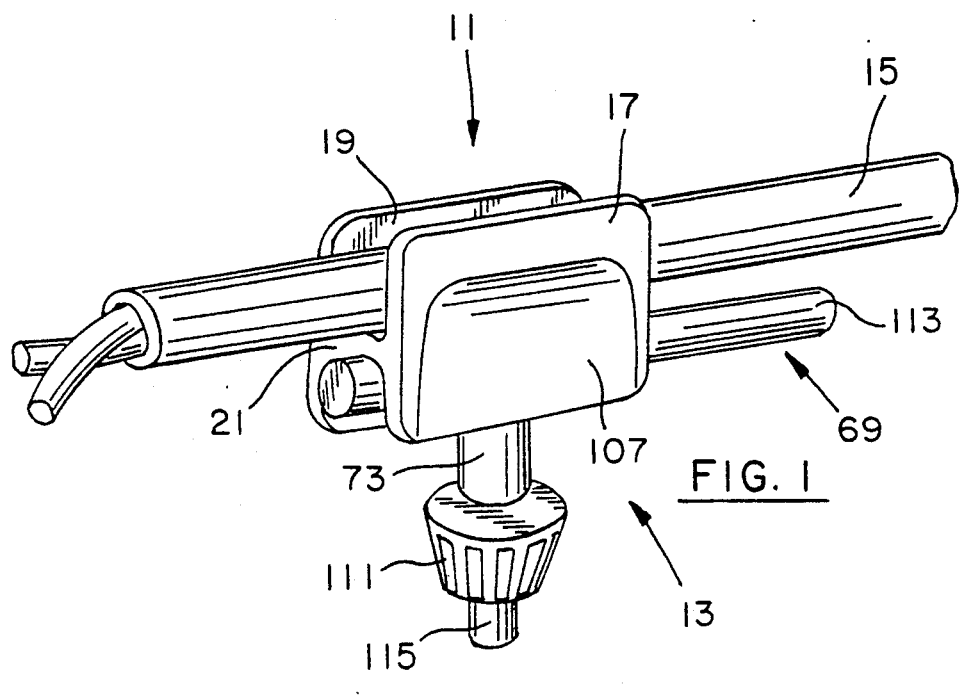
FIG. 1 is a perspective view of a clip, in accordance with the present invention, containing a chuck key and attached to a power cord.
Figure 2:
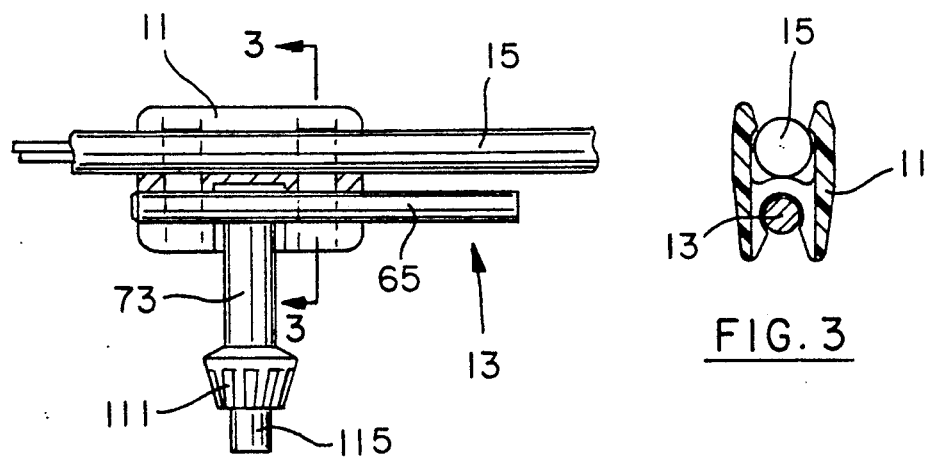
FIG. 2 is a cross-sectional view of the clip in FIG. 1 exposing the cord and chuck key.
Figure 3:
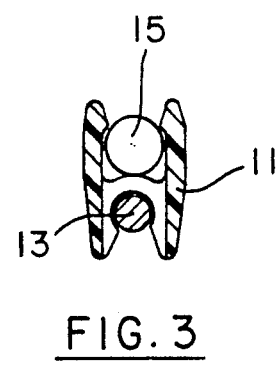
FIG. 3 is a cross-sectional view taken along line 3—3 of FIG. 2.

The preferred embodiment of a chuck key clip 11 for attaching a chuck key 13 to an electric power cord 15 is shown in FIGS. 1-7. FIGS. 1-3 show clip 11 with key 13 mounted in clip 11 and attached to power cord 15 with clip 11. FIG. 3-7 depict clip 11 with key 13 and cord 15 removed. FIG. 8A, 8B show alternate embodiments of cord clamps for clip 11. FIG. 9 depicts the preferred method for holding clip 11 and key 13 to tighten a drill chuck (not shown). FIGS. 10A-10E depict, in sequence, the preferred embodiment of a method for molding clip 11 in accordance with another aspect of the invention herein.

Figure 4:
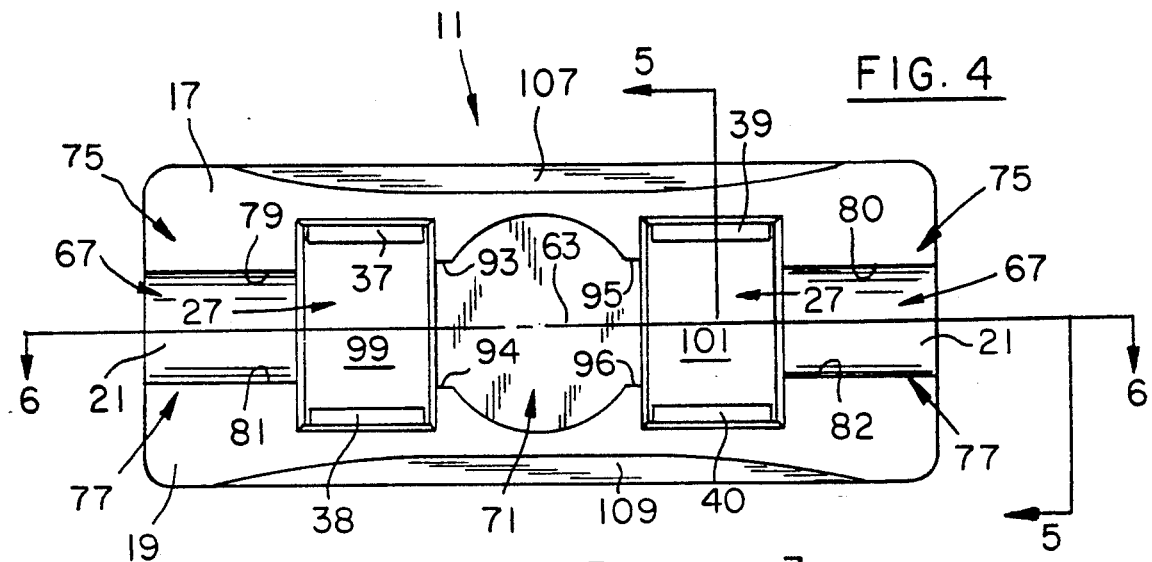
FIG. 4 is a side-elevational view of the clip of the present invention taken along lines 4—4 of FIG. 5.
Figure 5:
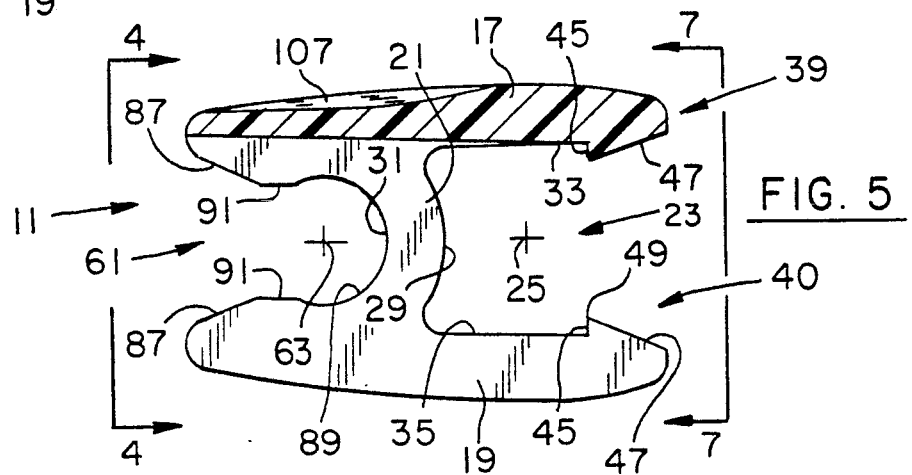
FIG. 5 is a cross-sectional view taken along line 5—5 of FIG. 4.

In accordance with the invention, as depicted in FIGS. 1-7, key 11 comprises a pair of spaced resilient sidewalls 17, 19 and a resilient web 21 connecting sidewalls 17, 19 to form, as shown in FIG. 3, 5, a generally "H"-shaped body. Preferably sidewalls 17, 19 and web 21 are molded in one piece of type 6 nylon.

A cord channel 23 for receiving electric cord 15 extends along a first axis 25, is defined by web 21 and sidewalls 17, 19, and has a cord clamp means 27 extending from sidewalls 17, 19 for gripping cord 15. Channel 23 is more specifically defined by one (wall 29) of the opposed walls 29, 31 of web 21 and the adjacent inner walls 33, 35 of sidewalls 17, 19.

Figure 6:
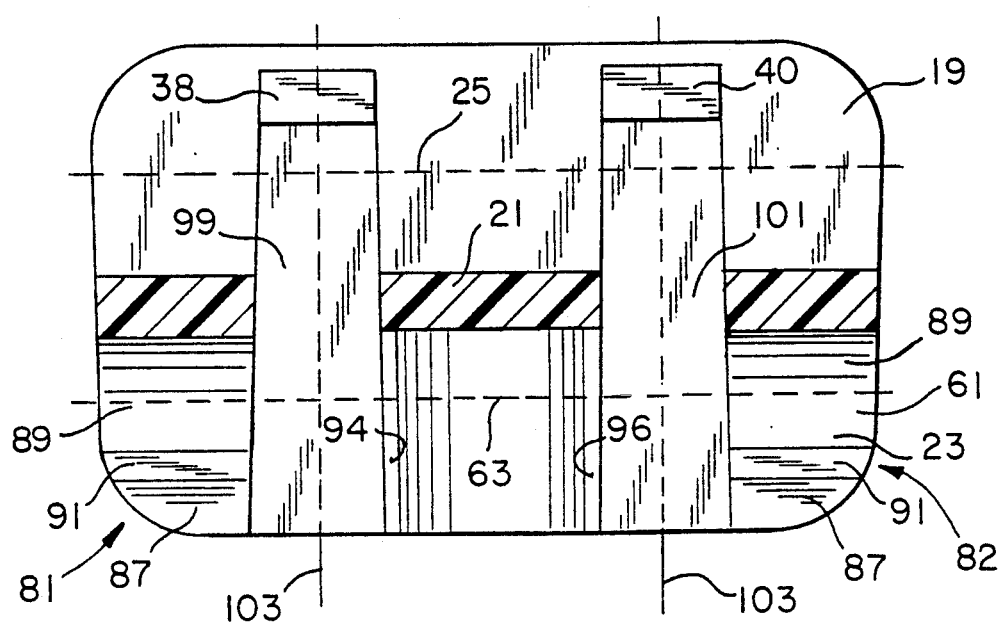
FIG. 6 is a cross-sectional view taken along line 6—6 of FIG. 4.

As embodied herein, cord clamp means 27 is preferably constituted by two pairs of barbs 37, 38; 39, 40 (FIGS. 2, 4, 6). In one pair, barb 37 extends from sidewall 17 and barb 38 extends from sidewall 19 toward the first barb 37. Similarly, in the second pair, barb 39 extends from sidewall 17 and barb 40 extends from sidewall 19 toward barb 39. As shown in FIG. 5, barb 37 comprises a wall 45 extending generally perpendicular from the surface of inner wall 33, an inwardly inclined wall 47 and a sharp edge 49 formed by the intersection of walls 45, 47. The construction of each of the remaining barbs 38-40 is identical to barb 37. Barbs 37-40 provide a secure, generally permanent gripping action on cord 15. Through the resilience of web 21 and inwardly inclined walls 47, cord 15 may be pushed into channel 23 by resiliently flexing sidewalls 17, 19 apart to allow the cord 15 to pass between barbs 37-40. However, due to the generally perpendicularly extending walls 45 and sharp edges 49, barbs 37-40 bite into the periphery of cord 15 and make selective removal of cord 15 from channel 23 difficult. Alternatively, if removal of cord 15 from channel 23 is desired, each pair of bars 37-40 may be formed as shown in FIG. 8A by an inwardly inclined wall 51 and an outwardly inclined wall 53. With this construction, sidewalls 17, 19 will separate sufficiently for insertion and selective removal of cord 15 from channel 23 by resiliently flexing web 21.

Alternatively, as shown in FIG. 8B, cord clamp means 27 may be constituted by a single barb 55 extending from one sidewalls 17, 19 toward the other sidewall 19 which has a smooth inner wall 57. Barb 55 may be constructed as depicted in either FIGS. 5 or 8A and sized to have a length sufficient to provide either a substantially permanent or releasable gripping action on cord 15 in channel 23. One or more barbs 55 spaced along a sidewall may be used.

Alternatively, cord clamp means 27 may be constituted by a single pair of barbs 37, 38. Other variations will be apparent to those skilled in the art.

In accordance with the invention, a key channel 61 for resiliently clamping a key handle 65 extends along a second axis 63 generally parallel to the first direction 25, is defined by the sidewalls 17, 19 and web 21, has a handle clamp 67 for receiving handle 65, and has a shank clamp 71 for receiving a key shank 73. Handle clamp 67 has a pair of jaws 75, 77 inwardly converging in a direction transverse to the second axis 63. As best shown in FIGS. 4, 6, jaw 75 preferably includes a pair of jaw segments 79, 80 extending from sidewall 17. Similarly, jaw 77 preferably comprises a pair of spaced jaw segments 81, 82 extending from sidewall 19 in a mutually opposed relationship respectively with jaw segments 79, 80. As shown in FIG. 5, jaw segment 79 comprises an inwardly inclined wall 87, an arcuate wall 89 and a flat wall extending between walls 87, 89. Jaw segments 80-82 are preferably configured identically to jaw segment 79. As so configured, handle clamp 67 provides a resilient snap fit clamping action on key handle 65 and a resilient release of jaws 75, 77 by flexing web 21 when removal of key 13 is desired.

Alternatively, handle clamp 67 may be constituted by a single pair of jaw segments 79, 80.

As best seen in FIG. 4, shank clamp 71 has two spaced pairs of jaws 93, 94; 95, 96 which inwardly converge in a plane parallel to the second axis 63. Jaws 93, 95 extend from sidewall 17 in a mutually opposed relationship to jaws 94, 96 extending from sidewall 19. Jaws 93-96 are sized and spaced to engage the periphery of key shank 73 to retain shank 73 within clamp 71 thereby preventing handle 69 from sliding longitudinally along axis 63 in channel 61. As a result, key 11 is firmly retained in handle clamp 67 and shank clamp 71 thereby reducing significantly the risk of losing key 13.

In accordance with another aspect of the invention, clip 11 may further comprise a pair of openings 99, 101 in web 21, opposite cord clamp means 27 in a direction 103 transverse to first and second axes 25, 63. As will be explained more fully below, openings 99, 101 result from the method for molding clip 11 in a mold having a cavity segment and a core segment movable only in a single direction (i.e., without side movement). As a result, the molding process is greatly simplified and reduced in cost thereby reducing the cost of production of clip 11. As explained above, cord clamp 27 may utilize one or two pairs of barbs 37, 38; 39, 40. If one jaw pair is utilized, then only a single opening 101, 103 in web 21 opposite to barbs 37, 38 in a direction transverse to axes 25, 63 is required.

In accordance with another aspect of the invention, as best shown in FIG. 1, 4 , 5, clip 11 may further comprise a thumb depression 107 formed in the outer surface of one sidewall 17 for ease of use and operator comfort. Preferably a second thumb depression 109 is formed in the outer surface of the second sidewall 19. The provision of depressions 107, 109 in each sidewall 17, 19 allows convenient use of key 13 with the left or right hand and permits the ends 110, 112 of clip 11 to be interchangeably located on cord 15 regardless of whether right handed or left handed use is anticipated.

As shown in FIGS. 1, 2 and 7, clip 11 is intended for use with key 13 comprising (1) handle 69, (2) shank 73 fixed at one end to and extending generally transverse from handle 69 and (3) a pinion 111 formed on the distal end of shank 73. Key handle 69 is received in channel 61 and has a distal end 113 extending from key channel 61 and forming a finger gripping portion. Key shank 73 is received in shank clamp 71 of key channel 61 and has a distal end 115 extending from key channel 61 generally transverse to the axis 63. As depicted in FIG. 9, an operator may grip clip 11 and key 13 by placing a thumb in the thumb depression 107 and one or two fingers encircling end 113 of handle 69 and cord 13. In this manner, clip 11 and key 13 are easily gripped and a high level of torque may be comfortably applied to clip 11 and key 13. The high torque level is further enhanced by the relatively long lever arm formed between shank 73 and the distal end 113 of handle 69.

The method for making clip 11 in a plastic injection mold 131 which does not require side action or side pulls is another important aspect of the invention. The method will be explained in connection with the method for making the preferred embodiment of clip 11 as depicted in FIGS. 1-7.

As shown in FIGS. 10A, 10B, mold 131 comprises cavity and core segments 133, 135 which are opened and closed along direction 137. Core segment 135 has (1) a pair of core barbs 139, 141 for forming clamp 27 in cord channel 23, (2) a core projection 142 for forming shank clamp 71 in key channel 61, (3) a pair of slidable ejectors 143, 145 for forming handle clamp 61 in key channel 61, (4) ejector pins 147, 149 slidable in ejectors 143, 145, respectively, and (5) a central slidable ejector pin 148. Pins 147-149 eject the part 11 from ejectors 143, 145. Ejectors 143, 145 and pins 147-149 are slidable relative a base portion 151 of core segment 131 which (base portion) includes barbs 139, 141 and projection 142.

The sequence of operation of mold 131 is shown schematically in FIGS. 10A-10E. In brief, mold 131 operates as follows. Initially in FIGS. 10A, 10B, mold 131 is closed. Liquid plastic is injected into the part cavity formed by the cavity segment 133 and core segment 135 of mold 131. After cooling, in FIG. 10C mold 131 is opened by moving core segment 135 and molded clip 11 away from cavity segment 133 along direction 137. Next, in FIG. 10D, ejectors 143, 145 and ejector pins 147-149 are slid simultaneously together relative to base portion 151, which includes core bars 139, 141 and core projection 142 to thereby eject part 11 from base portion 151. Finally, in FIG. 10E, ejector pins 147-149 are slid simultaneously relative to base portion 151 and ejectors 143, 145 to eject part 11 from ejectors 143, 145.

In accordance with this aspect of the invention, a method is provided for molding key 11 which comprises three primary steps. The first step is to mold clip 11 in mold 131 having cavity segment 133 and core segment 135 which are relatively movable back and forth between an open position and a closed position in a direction 137 transverse to axes 25, 63 in which channels 23, 61 extend. Except as indicated herein, mold 131 may be constructed in accordance with conventional techniques for plastic injection molds for materials such as nylon. Preferably, cavity segment 133 and core segment 135 are relatively movable back and forth along direction 137 between a closed position (FIG. 10A) and open position (FIG. 10C) by conventional means (not shown).

The second step is to form clamp 27 inwardly converging in a direction transverse to direction 137 in the first channel 23 on core bars 139, 141. Bars 139, 141 extend parallel to direction 137, through the second channel 61, through openings 99, 101 in web 21 and into channel 23. As set forth above, clamp 27 may be constituted by either one or two sets of barbs 37-40. If one pair of barbs 37-40 is utilized, then only a single core bar 139, 141 is utilized to form clamp 27.

The third step is to form in clamp 67 inwardly converging in a direction transverse to direction 137 in channel 61 on core ejectors 143, 145 which extend parallel to direction 137. As noted above, handle clamp 67 may be constituted by one or two pairs of jaw segments 79, 81; 83, 85. If handle clamp 67 is constituted by a single pair of jaw segments 79-82 then only a single core ejector 143, 145 is utilized.

In accordance with alternate embodiment of the method for forming clamps 27, 67 in channels 23, 61, when clamp 27 is constituted by barbs having an outwardly inclined walls 53 as depicted in FIG. 8A, clamp 27 may be formed on a core ejectors 143, 145 and handle clamp 67 may be formed on a core bars 139, 141.

As shown in FIG. 10C, for ejection of clip II from mold 131, mold 131 is opened by a relative movement of cavity segment 133 and core segment 135 in direction 137 to separate cavity segment 133 from clip 11 and core segment 135. Preferably as shown in FIG. 10C, core segment 135 and clip 11 are moved and cavity segment 133 remains stationary.

As shown in FIG. 10D, clip 11 is ejected from the base portion 151 of core segment 135 by relative movement of core ejectors 143, 145 and base portion 151 in direction 137. Clip 11 remains supported on ejectors 143, 145. As shown in FIG. 10D preferably, base portion 151 remains stationary, and ejectors 143, 145 and pins 147-149 are moved in direction 137 to separate clip 11 from base portion 151. Preferably core bars 139, 141 are removed from clamp 27 simultaneously with the ejection of clip 11 from base portion 151. Alternatively, core bars 139, 141 may be removed from cord clamp 27 in channel 23 subsequent to the ejection of clip 11 from base portion 151.

Lastly, as shown in FIG. 10E, clip 11 is separated from ejectors 141, 143 by moving ejector pins 147-149 relative to ejectors 143, 145 to eject clip 11 from ejectors 143, 145. Alternatively, core bars 139, 141 could move with ejectors 143, 145 to separate clip 11 from base portion 151. In this case, then ejector pins 147-149 serve to simultaneously remove ejectors 143, 145 from key channel 61 and ejector bars 139, 141 from core channel 23.

The method for making clip 11 in a mold without "side movement" or "side pulls" (i.e., the requirement to have mold components which move laterally to the direction 137 for opening and closing the mold) simplifies the manufacturing process, reduces mold equipment cost and should result in a more durable mold. As a result the key clip may be produced at a significantly reduced per unit cost.

As will be appreciated, clip 11 also has significant advantages. By the use of handle clamp 67 and shank clamp 71 to retain key 13 in clip 11 significantly reduces the risk of losing key 13 due to the key sliding longitudinally out of channel 61 along axis 63. In addition, key 13, if desired, may be simply removed from clip 11 for use. However, as depicted in FIG. 9, clip 11 and key 13 are conveniently and comfortably used with clip 11 attached to cord 15. Thumb depressions 107, 109 and the alignment of key handle 69 with cord 15 contribute to the simplicity of use and enable a relatively high torque to be comfortably applied to key 13 by an operator. Because key 13 may be simply and comfortably used without detachment from cord 15, key 13 may be stored permanently in a convenient location and the risk of losing key 13 is minimized.

A key clip and a method for making the clip in accordance with the invention have been explained in connection with a preferred embodiment and various modifications. Other modifications and variations can be made in the method and key clip of the present invention without departing from the spirit and scope of the invention. Thus, it is intended that the present invention cover these modifications and variations provided they come within the scope of the appended claims and their equivalents.

We claim:

1. A clip for a chuck key having a handle and a shank, said clip comprising:
   a pair of spaced, resilient sidewalls;
   a resilient web connecting the sidewalls;
   an electric cord channel for receiving an electric cord, said cord channel extending along a first axis and defined by the web and sidewalls, said cord channel having cord clamping means extending from the sidewalls for gripping the electric cord; and
   a key channel for resiliently clamping the key handle, said key channel extending along a second axis parallel to the first axis and defined by the sidewalls and the web said key channel having:
   a handle clamp for receiving the key handle and inwardly converging in a plane transverse to the second axis; and
   a shank clamp for receiving the key shank and inwardly converging in a plane generally parallel to the second axis.

2. The clip of claim 1 wherein the cord clamping means is a barb extending from at least one sidewall and having a sharp edge.

3. The clip of claim 1 wherein the cord clamp means is a pair of barbs, one barb extending from one sidewall and a second barb extending from the second sidewall toward the first barb.

4. The clip of claim 2 wherein the barb comprises a wall extending generally perpendicular from the surface of the one sidewall.

5. The clip of claims 2 or 4 further comprising an opening in the web opposite to the barb in a direction generally transverse to the first and second directions.

6. The clip of claim 1 further comprising an opening in the web opposite to the cord clamping means in a direction transverse to the first and second axis.

7. The clip of claim 1 wherein:
   the cord clamp means is a first pair of barbs and a second pair of barbs spaced from the first pair of barbs along the first axis; and
   first and second openings are in the web opposite, respectively, to the first and second pair of barbs in a direction transverse to the first and second axis.

8. The clip of claim 1 wherein:
   each sidewall has an inner and outer surface; and
   a thumb depression is formed in the outer surface of one sidewall.

9. The clip of claim 1 wherein:
   each sidewall has an inner and outer surface; and
   a thumb depression is formed in the outer surface of each sidewall.

10. A chuck key clip comprising:
    a pair of spaced resilient sidewalls, each sidewall having inner and outer surfaces;
    a web having opposed sides and connecting the sidewalls to form an "H"-shape;
    a cord channel for receiving an electric cord, said cord channel extending along a first axis and defined by the sidewalls and one of the sides of the web;
    a key channel for receiving the key handle, said key channel extending along a second axis generally parallel to the first axis and formed by the sidewalls and the opposite side of the web; and
    a thumb depression formed in the outer surface of one sidewall.

11. The chuck key clip of claim 10 wherein a second thumb depression is formed in the outer surface of the other sidewall.

12. An apparatus comprising:
    a chuck key comprising:
    a handle;
    a shank fixed at one end to and extending generally transverse from the handle;
    a pinion formed at the distal end of the shank;
    a clip comprising:
    a pair of spaced, resilient sidewalls, each sidewall have an inner and outer surfaces; and
    a web having opposed sides in connecting the sidewalls to form an "H"-shape;
    a cord channel for receiving an electric cord, said cord channel extending along a first axis defined by the sidewalls and one of the sides of the web;
    a key channel extending in a second direction generally parallel to the first direction and formed by the sidewalls and the opposite side of the web
    said key handle received in the key channel and having a distal end extending along the second direction from the key channel and forming a finger gripping portion,
    the shank received in the key channel and having the distal end extending from the key channel generally transverse to the second direction, and
    a thumb depression formed in the outer surface of one sidewall.

13. A clip for a chuck key having a handle and a shank, said clip comprising:
    a pair of spaced, resilient sidewalls;
    a resilient web connecting the sidewalls;
    an electric cord channel for receiving an electric cord, said cord channel extending along a first axis and defined by the web and sidewalls, said cord channel having cord clamping means extending from the sidewalls for gripping the electric cord; and
    a key channel for resiliently clamping the key handle, said key channel extending along a second axis parallel to the first axis and defined by the sidewalls and the web said key channel having:
    a handle clamp for receiving the key handle and inwardly converging in a direction transverse to the second axis; and
    an opening in the web opposite to the cord clamping means in a direction transverse to the first and second axes.

14. The clip of claim 13 wherein the cord clamping means is a barb extending from at least one sidewall and having a sharp edge.

15. The clip of claim 13 wherein the cord clamping means is a pair of barbs, one barb extending from one sidewall and a second barb extending from the second sidewall toward the first barb.

16. The clip of claim 14 wherein the barb comprises a wall extending generally perpendicular from the surface of the one sidewall.

* * * * *